United States Patent Office 2,878,182
Patented Mar. 17, 1959

2,878,182

PURIFICATION OF A RECIRCULATING SOLVENT

Herman S. Bloch, Chicago, Ill., assignor to Universal Oil Products Company, Des Plaines, Ill., a corporation of Delaware No Drawing. Application July 20, 1953
Serial No. 369,222

3 Claims. (Cl. 208—321)

This invention relates to an improved solvent extraction process and in particular to a method of treating the solvent used therein in a manner to maintain its desirable characteristics.

Solvent extraction processes are used to separate substances from other substances by a separation process based upon a difference in solubility of the two substances in a mutual solvent. It is frequently desirable to separate various substances by solvent extraction when the substances to be separated have similar boiling points, are unstable at the temperatures at which a fractionation is effected, form constant boiling mixtures, etc. Some typical examples of solvent extraction processes are the separation of polar compounds from less polar compounds as for example the separation of aromatic hydrocarbons from non-aromatic hydrocarbons, sulfur-containing organic compounds from hydrocarbons, olefins from paraffins, oxygen-containing compounds from hydrocarbons etc. As hereinbefore stated, the basis of such a separation is the difference in solubility in the mutual solvent of one of the substances to be separated from the other. Two important factors to examine in selecting a solvent are the solubility of the substances in the solvent and the difference in solubility of the substances in the solvent. For example, when it is desired to separate compound X from compound Y by a solvent extraction process, both the amount of X and Y that will dissolve in the mutual solvent must be ascertained so that one may design a process capable of dissolving sufficient X in a reasonable amount of solvent and also capable of dissolving a sufficiently greater amount of X than Y so that a separation may be effected. Less total solvent throughput is required in the process as solubility increases; and fewer contacting stages are required in a given process to effect the desired separation as the solubility difference increases.

It has been found that solvents may be adjusted in composition so that they have wide ranges of solubility and solubility differences for each of the components of the feed stock mixture, making them selective for one component or another. A classic example of a selective solvent is a hydrophilic organic solvent mixed with water, acting as a selective solvent for hydrocarbon mixtures. In such a selective solvent, when the proportion of water to solvent is increased the solubility difference is increased and the total solubility is decreased. Thus, by adding more water to the solvent fewer contacting stages are required but a greater solvent throughput is required to effect a given separation. It may readily be seen that by balancing these factors a selective solvent may be produced which has exactly the right characteristics for the separation to be effected.

When a solvent extraction process is designed one may start the design with a suitable solvent and construct the equipment to effect the desired separation. One may also design a solvent extraction process by using existing equipment and mixing a selective solvent that is particularly suitable for use in that equipment. In either case it is easily seen that when the process has been designed it is extremely important to keep the various factors constant. In a given solvent extraction process wherein the solvent is specifically designed to perform a particular function, any changes in the characteristics of the solvent will cause the process to function less efficiently or, if the changes are extremely great, to cause the process to be inoperable. Such changes as a slight difference in the selectivity of the solvent have the effect of causing a less efficient separation, that is, the separation desired will not be attained. Changes such as the formation of stable emulsions will make the process wholly inoperable.

For example, in a process for selectively extracting aromatic hydrocarbons from a hydrocarbon mixture, a particularly suitable solvent comprising a mixture of diethylene glycol and water, triethylene glycol and water, dipropylene glycol and water, or both a polyethylene glycol and a polypropylene glycol and water may be employed. When pure diethylene glycol is used as a solvent, to cite a specific example, it is found that the solubility of paraffinic hydrocarbons is too high in the solvent and results in an extract phase similar to the charge stock and only slightly enriched in aromatic hydrocarbons. When the equilibrium data from a system of hydrocarbons and pure diethylene glycol is used to design a solvent extraction process, it is found that an excessive number of contacting stages are required to effect the desired separation. By suitably diluting the diethylene glycol solvent with water, the amount of hydrocarbon dissolved in a given amount of solvent is reduced but the concentration of the aromatic hydrocarbons in the amount that is dissolved is increased, thereby reducing the number of stages required to effect any given separation at the expense of requiring a greater throughput of solvent to dissolve the same amount of aromatic hydrocarbons from the charge. In addition to varying the solubility characteristics of the solvent, water may also be used to regulate the emulsifying characteristics, wetting tendencies, viscosity etc. The amount of water used will vary with the amount of selectivity desired, the temperature at which the extraction is effected, the composition of the original charge stock, the effect of water on other physical characteristics of the solvent, etc.

It has been found that in a typical solvent extraction process wherein the selective solvent is recycled between an extraction zone and a stripping zone so that the solvent is reused, the characteristics of the solvent gradually change. These changes are extremely undesirable for reasons hereinbefore discussed and although the changes may be compensated for, in the early stages of the process, by the addition or withdrawal of water from the solvent, eventually they reach a magnitude that requires the removal of the solvent from the system and the addition of fresh solvent. In determining the cause of these changes it has been found that even such stable compounds as glycols will deteriorate to a small extent after continuous use as a solvent and after numerous contacts with hot surfaces, traces of catalytic metals such as iron, zinc, chromium, nickel, etc. and compounds thereof as well as with oxygen, oxides and peroxides. The deterioration will generally be in the direction of forming acids and the acids thus formed will further corrode the equipment and introduce more metallic contaminants into the solvent which further catalyze the deterioration. The tendency is for the rate of change of the characteristics of the solvent to increase as its impurity content increases, or in other words, the degeneration of the solvent has a "snowballing" effect. It is not practical, particularly in large commercial installations, to continuously discard contaminated solvent and continuously add fresh solvent, since the quantity of solvent used is rather large and the cost of replacing the solvent is rather high. It is an object of this invention to maintain the solvent used in a solvent extraction process in a state of regulated selectivity and of constant characteristics.

It is an embodiment of the present invention to improve a solvent extraction process wherein a selective solvent contacts a mixture of hydrocarbons and selectively dissolves the more polar components by contacting at least a portion of the selective solvent with an anion exchange resin.

Since it has been found that the greatest cause of changing characteristics of a selective solvent is the formation of acids in the solvent, the use of an anion exchange resin to remove the acids effectively prevents the degradation of the solvent. It is a highly practical method of effecting the desired result, since the amount of impurity formed in a clean solvent is relatively small. Therefore, in a solvent extraction process employing large quantities of solvent it is not necessary to employ correspondingly large quantities of ion exchange resin since the amount of impurity to be removed from the solvent is very small if the "snowballing" effect is prevented by maintaining a low impurity level. It is contemplated that the impurity level of the solvent may be depressed by treating only a slip stream of the total solvent rather than a full stream; however, it is of course preferable to treat the full stream so that there are substantially no impurities in the solvent stream entering the extraction zone.

Although the anion exchange resins are particularly effective for the above purposes, when the contaminant is a cationic material, it may also be desirable to employ, in conjunction with said anion exchange resin, a cation exchange resin to thereby eliminate all impurities, including anionic contaminants such as, for example, metal ions.

A typical apparatus for effecting a solvent extraction will generally comprise, in combination, an extraction zone provided with suitable means for effecting intimate contact between two substantially immiscible liquid streams, thereby producing a raffinate phase and an extract phase; and a separation zone. The extract phase contains the solvent and the material which was selectively dissolved from the charge stock, while the raffinate phase contains the less soluble material in the original charge stock. The extract phase is passed to a separation zone, usually called a stripper, which separates the dissolved material from the solvent after which the solvent is returned to the extraction zone to be further used as a selective solvent. In general, the preferred method of effecting the present purification procedure is to treat the stream of regenerated solvent recycled from the stripping zone to the extraction zone, that is, the solvent stream that is free of dissolved product, although it is, of course, feasible to treat instead a withdrawn portion of the fat solvent stream passing from the extraction zone to the stripping zone.

Any suitable anion exchange resin may be used in the process of the present invention; however, the resin employed must be selected with due regard to the operating conditions of the solvent extraction, such as temperature, pH, pressure, etc. The preferred anion exchange resins are the quaternary ammonium hydroxides of amine derivatives of styrene-divinylbenzene copolymers which remove cations so completely as to render the effluent glycol slightly basic and therefore non-corrosive. Suitable cation exchange resins may be of the sulfonic acid type, such as sulfonated phenol formaldehyde resins or sulfonated styrene-divinylbenzene copolymers, carboxylated resin types, and others and these must also be selected with due regard for their ability to function under the existing operating conditions.

When both anion and cation exchange resins are used they may be in separate beds, as separate parts of the same bed, or intermingled in the same bed. It is preferable to have several beds of ion exchange materials arranged in parallel flow so that the total stream may pass through all or just some of the beds. It is also preferred to have a by-pass line around all of the beds so that at least a portion of the stream may be passed directly to the extraction zone when desired. The advantage of a flow, in which any one or all of the beds may be blocked out of the stream, is that any particular anion exchange resin bed may be regenerated or replaced while the unit functions undisturbed. This arrangement also permits treatment of the full stream or of a slipstream.

When a relatively large number of ion exchange resin beds, say 6, are used in parallel flow the impurity level of the solvent stream may be controlled to a very constant amount by establishing a regular interval for regenerating or replacing the resin in the beds. For example, when 6 beds are used in parallel one bed may be regenerated every 8 hours thereby leaving 5 beds in service, each having a different period of service. When the 8 hour regeneration period has elapsed, the bed being regenerated may be returned to service and the bed then having the longest period of service may be taken out of service and regenerated. A similar system may be established with a plurality of beds in series if each of the beds is incorporated into the flow so that it may be by-passed.

Following is an example presented to further illustrate the process of this invention but not intended to unduly limit the invention to the particular process or materials described.

EXAMPLE

A solvent extraction process employed to remove benzene from a hydrocarbon fraction containing benzene, naphthenes, and paraffins and having a benzene content of 47% by weight used a selective solvent comprising diethylene glycol in a concentration of 92.5 weight percent and water. After 45 days of operation a sample of the lean solvent was withdrawn and divided into two portions. One portion was treated with the hydroxide form of Dowex-2, a cationic, quaternary ammonium hydroxide type ion exchange resin by pumping the glycol upward through a vertical bed containing 20 cc. (12.3 g.) of this material at a liquid hourly space velocity of 1.5. Passage through the bed was continued until the acid number of the effluent reached 0.4 (this was usually a rather sharp end-point, since the acid number of the effluent rose abruptly when the bed was almost spent), after about 35–40 volumes of feed per volume of resin bed passed. The resin was then regenerated by passage of six volumes of 6% aqueous sodium hydroxide downward through the bed, followed by washing with 12 volumes of water. The cycle was then begun again. The entire procedure was repeated 11 times, at the end of which 400 volumes of feed had been treated, or 1.86 bbl. per pound of resin. The resin at this time was of unimpaired utility except for a slight increase in pressure-drop across the bed. Analyses on both the composite of the treated and untreated samples of solvent are presented in the following table.

*Table*

| | Solvent before treatment | vent after treatment |
|---|---|---|
| ph at 50% dilution | 5.2 | 8.5. |
| Acid number | 0.65 | 0.05. |
| Ash at 900° C., p. p. m | 519 | 155. |
| Fe, p. p. m | 590 | 83. |
| Steam jet residue (500° F.), mg./ 100 ml. | 158 | 27. |
| Appearance | Dark brown, opaque, contains non-filterable suspended solids. | Bright yellow in color. |

Removal of most of the iron with Dowex-2 was taken to indicate that the iron was mainly present as the partial salt of dibasic acids, and hence was removed with the anions.

Treatment of the same lean glycol with a mixed bed of Dowex-2 and Dowex-50 (a sulfonic acid-type resin) yielded an effluent which was substantially neutral, almost ion-free, clear, and pale yellow in color.

It may readily be seen from the data that the process of the present invention greatly improves the desirable characteristics of the selective solvent by the treatment with anion exchange resings or with mixed anion-cation exchange resins.

The process of the present invention provides a solution to a long existing industrial problem. By recognizing that extremely small quantities of acids formed during a solvent extraction process cause large changes in the characteristics of a selective solvent, and by effecting the removal of these acids, the present process improves the solvent extraction art to make it more attractive commercially and thereby more extensively useable.

I claim as my invention:

1. In a process for the separation of an aromatic hydrocarbon from a hydrocarbon mixture containing the same by extraction with a cyclically circulating selective solvent comprising water and a glycol selected from the group consisting of diethylene glycol, triethylene glycol and dipropylene glycol, the method of retarding deterioration of the selective solvent and maintaining the solvent characteristics of the latter substantially constant, which comprises contacting at least a portion of the circulating selective solvent with an anion exchange resin to remove the acids contained therein.

2. The process of claim 1 further characterized in that said solvent comprises diethylene glycol and water.

3. The process of claim 1 further characterized in that said anion exchange resin comprises quaternary ammonium hydroxides of amine derivatives of styrene-divinylbenzene copolymers.

References Cited in the file of this patent

UNITED STATES PATENTS

| | | |
|---|---|---|
| 2,162,195 | Greensfelder et al. | June 13, 1939 |
| 2,172,436 | Cooke et al. | Sept. 12, 1939 |
| 2,246,297 | Duncan et al. | June 17, 1941 |
| 2,409,441 | Metzger | Oct. 15, 1946 |
| 2,444,582 | Smith | July 6, 1948 |
| 2,566,353 | Mills | Sept. 4, 1953 |
| 2,803,685 | Poffenberger et al. | Aug. 20, 1957 |